April 23, 1940.   J. POE   2,198,291
AUTOMATIC AIR RELIEF VALVE
Filed June 13, 1939
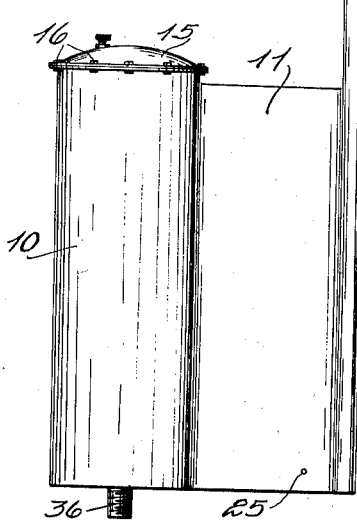
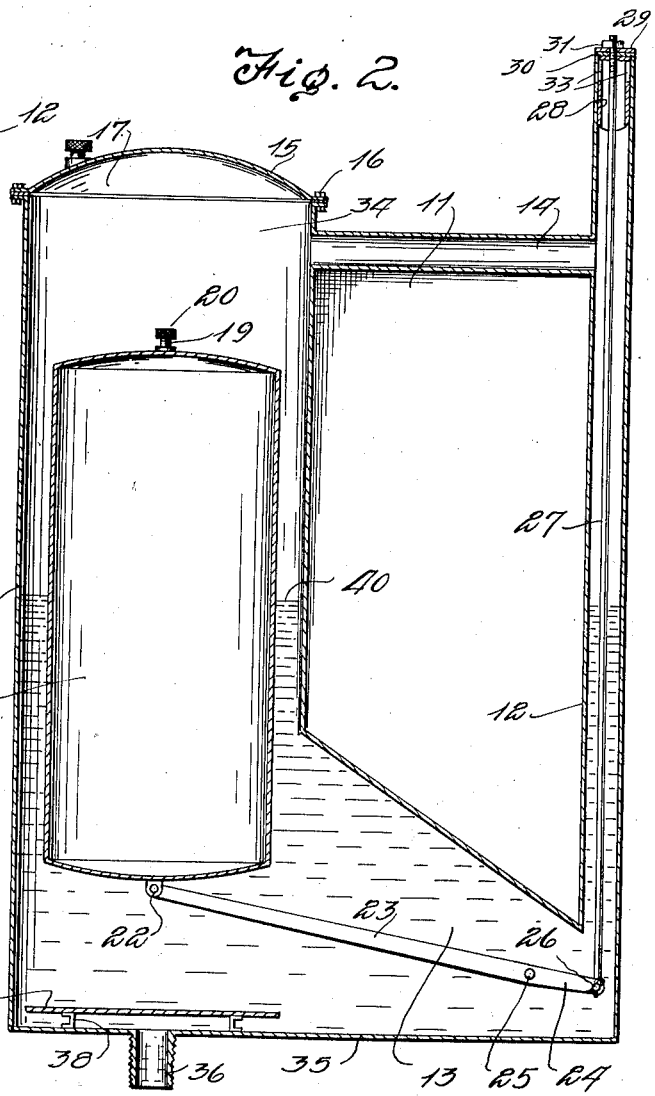
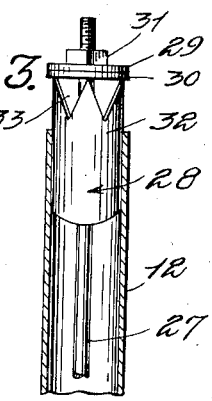
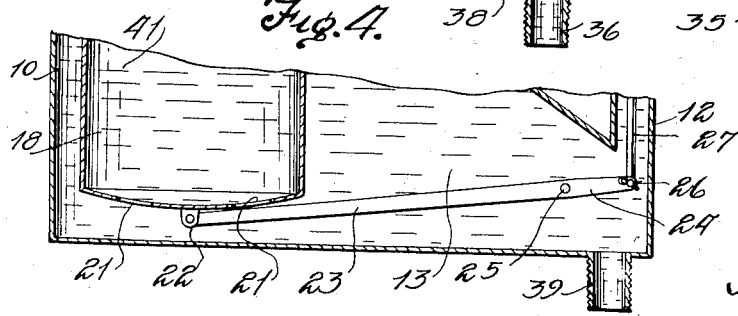
Inventor
John Poe Patented Apr. 23, 1940

2,198,291

UNITED STATES PATENT OFFICE 2,198,291

AUTOMATIC AIR RELIEF VALVE

John Poe, Amarillo, Tex., assignor of one-fourth to Willie F. Turner, Amarillo, Tex.

Application June 13, 1939, Serial No. 278,962

2 Claims. (Cl. 137—69)

This invention relates to air relief valves for water lines, oil lines to refineries, etc., gasoline lines to and from refineries, etc., gasoline lines on automobiles, tractors and other engines for the purpose of preventing what is known as vapor lock.

However, instead of repeating all the uses to which this invention may be put, in the following specification, it will be described and claimed as connected in a water line, the term water in this connection being understood to include all liquids in which air may be entrained or from which vapor may arise.

In all water lines there is a certain amount of air entrained in the water, which, at the upper portions or peaks of said lines, collects and interferes with the flow of water through such lines.

One important object of this invention is to automatically release, from the water line, air so collected.

A second important object of the invention is to provide automatic means whereby, in accordance with the amount of air collected, air will be released so that the water flow may continue uninterrupted.

A third important object of the invention is to provide novel means for regulating the escape of air.

A fourth important object of the invention is to provide a novel valve arrangement for controlling the escape of air.

With the above and other objects in view, the invention consists in general of certain novel details of construction and combinations of parts hereinafter fully described, illustrated in one form in the accompanying drawing, and particularly pointed out in the appended claims.

In the accompanying drawing like characters of reference indicate like parts in the appended views, and:

Figure 1 is a side elevation of one form of the device adapted to be applied to any high point or peak of a water line.

Figure 2 is a vertical longitudinal section taken on the median parallel line of Figure 1.

Figure 3 is an enlarged section of the valve arrangement shown in Figure 2.

Figure 4 is a modified section of the lower part of Figure 2.

In the construction of the apparatus herein shown there is provided a hollow cylindrical body 10 having a lateral extension 11, and provided with a nipple or valve 10ᵃ for admission of air to permit drainage of the body 10 when there is no water in the water line. At the side of the lateral extension remote from the body 10 there is provided a tubular member 12. The body 10 is connected to the tubular member 12 at its lower end through a passage 13 and at its upper end through a pipe 14 so that there is communication both above and below the member 10 and the member 12 by suitable passages. The passage 13 is vertically extending for purposes which will be presently understood.

On top of the member 10 is a cover plate 15 secured to the upper end of the member 10 by bolts 16, a gasket 17 being provided between the body 10 and the cover plate 15 in order to prevent escape of air at this place.

A float 18 is mounted in the body 10 and always contains a certain amount of air. The quantity of air in this float may be regulated through the nipple 19. In other words, the cover plate may be taken off when required, and an air pump or the like be connected to the nipple 19 after removing the cap 20 so that as much air as may be desired may be supplied to the float 18. The lower end of this float is provided with ports 21 whereby water may be admitted to the float or expelled therefrom in accordance with the quantity of air in the upper part of the float. At the center of the lower part of the float there is provided a boss 22 whereto is pivoted the longer arm 23 of a lever having a shorter arm 24, a pivot 25 carried in the sides of the portion 11 supporting this lever for tilting movement. The extremity of the shorter arm of the lever is pivoted at 26 to a valve rod 27 which extends up through the tubular member 12 and carries at its upper end a valve member indicated in general at 28. This valve member 28, in the form here shown is moveable to close or open, under the required circumstances the upper end of the member 12 which may be called the air outlet member. As here shown the valve member 28 is provided with a plate 29 having a gasket 30 therebeneath and having an adjusting nut 31 whereby the valve member is held in desired position on the valve stem 27. The valve member itself consists of a cylindrical body 32 notched as at 33 at its upper part so that when these notches rise above the member 12 they extend communication, through the pipe 14 with the upper part of the body 10, such upper part forming an air chamber 34. The entire device has a bottom wall 35 and in the form shown in Figures 1 and 2, a water inlet pipe or nipple, adapted to be connected to the water line, opens directly beneath the float 18 but there is a splash plate 37 secured to the bottom by legs 38 so that water entering the passage 36 will not directly affect the float. However, in the form shown in Figure 4 a connection 39 may be made for connecting the device to the water line so that the water entering this connection, adjacent the tubular member 12, will not directly affect the float.

Now in operation we may suppose that this device is connected to the peak of a rise in the water line, and that water with entrained air enters through the connection 36 or the connection 39. The quantity of air in the float 18 may be supposed to be adjusted to cause this float to conform to the pressure such as would be produced in the water line as sufficient to raise the water to the line 40 of Figure 2. That is the air in the float would be regulated under these conditions to normally come down to the water line 41 due to water flowing through the ports 21. We may now consider that there has been an accumulation of air above the normal line 40 and this of course will effect depreciation of the float 18. Upon this effect being obtained then the float will naturally fall so that the lever 23 will be tilted downwardly and the arm 24 will be tilted upwardly. Thereupon the valve stem 27 will raise the valve 28 and effect opening of the ports 33 by raising these ports above the upper end of the tubular member 12. When this is done air will escape from the chamber 34 through the pipe 14 and pass into the outer air. The result of this will be that the accumulated air above the water line 40 will have its pressure decreased and the float 18 will rise so as to actuate the lever to move the valve 28 downwardly and thus prevent any further outflow of air until the conditions are again reversed.

There has thus been provided a simple and efficient device of the kind described and for the purpose specified.

It is obvious that many minor changes may be made in the form and construction of this invention without departing from the material principles thereof. It is not therefore desired to confine the invention to the exact form herein shown and described, but it is desired to include all forms which may properly come within the scope of the appended claims.

Having thus described the invention, what is claimed as new is:

1. In a device of the kind described, a body having a float chamber therein and provided with means for communication with a water line beneath said float chamber, a float mounted in said float chamber to rise and fall in accordance with the water level therein, an outlet tube connected with said float chamber and communicating therewith at the top and bottom thereof, a lever pivoted intermediately its ends and having one end connected to the lower side of the float, a valve at the outlet end of said tube, and a valve stem extending through said tube and connecting the remaining end of said lever with the valve at the outlet end of said tube.

2. In a device of the kind described, a cylindrical hollow body having its axis vertical, a chamber extending outwardly from the lower part of the body and vertically converging outwardly from the body to form a passage, an outlet tube extending vertically upward from the outer end of said chamber, a tubular member connecting the spaces at the upper ends of said body and outlet tube, a vertically disposed hollow cylinder mounted in said body to constitute a float, said body having a bottom provided with an inlet axially aligned below said float, a baffle supported on the bottom in upwardly spaced parallel relation thereto, a lever having one end pivoted to the lower end of the float and pivoted intermediate its ends in said passage, the remaining end of said lever terminating below the outlet tube, a vertically movable outlet valve at the upper end of the outlet tube, and a rod connecting said valve and the last mentioned end of the lever.

JOHN POE.